United States Patent
Ozaki

(10) Patent No.: US 9,989,134 B2
(45) Date of Patent: Jun. 5, 2018

(54) DUAL CLUTCH TRANSMISSION

(71) Applicant: ISUZU MOTORS LIMITED, Tokyo (JP)

(72) Inventor: Sho Ozaki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days. days.

(21) Appl. No.: 15/510,550

(22) PCT Filed: Sep. 9, 2015

(86) PCT No.: PCT/JP2015/075641
§ 371 (c)(1),
(2) Date: Mar. 10, 2017

(87) PCT Pub. No.: WO2016/039389
PCT Pub. Date: Mar. 17, 2016

(65) Prior Publication Data
US 2017/0261081 A1    Sep. 14, 2017

(30) Foreign Application Priority Data
Sep. 10, 2014  (JP) ................. 2014-184469

(51) Int. Cl.
*F16H 37/06* (2006.01)
*F16H 3/00* (2006.01)
(Continued)

(52) U.S. Cl.
CPC .......... *F16H 37/065* (2013.01); *F16H 3/006* (2013.01); *F16H 3/091* (2013.01); *F16H 3/48* (2013.01)

(58) Field of Classification Search
None
See application file for complete search history.

(56) References Cited

U.S. PATENT DOCUMENTS

| 4,976,671 A | 12/1990 | Andersson |
| 2005/0101426 A1 | 5/2005 | Sugino et al. |

(Continued)

FOREIGN PATENT DOCUMENTS

| JP | S60-231048 A | 11/1985 |
| JP | S61-274147 A | 12/1986 |

(Continued)

OTHER PUBLICATIONS

International Search Report and Written Opinion for PCT App No. PCT/JP2015/075641 dated Nov. 17, 2015, 8 pgs.

*Primary Examiner* — Jacob S. Scott
*Assistant Examiner* — Timothy Hannon
(74) *Attorney, Agent, or Firm* — Procopio, Cory, Hargreaves & Savitch LLP

(57) ABSTRACT

A dual clutch transmission 1 includes a first clutch 2, a second clutch 3, a first input shaft 4, a second input shaft 5, a counter shaft 6, an output shaft 7, a first splitter gear changing portion 10, a second splitter gear changing portion 20, and an output portion 30. The first splitter gear changing portion 10 has a first input gear 11a, a first counter gear 11b, a second input gear 12a, a second/counter gear 12b, and a first coupling mechanism 13. The second splitter gear changing portion 20 has an input/output gear 21a, a third counter gear 21b, a second coupling mechanism 22, and a third coupling mechanism 23. The output portion 30 has a fourth counter gear 31a, a forward output gear 31b, and a fourth coupling mechanism 33.

2 Claims, 8 Drawing Sheets

(51) Int. Cl.
*F16H 3/091* (2006.01)
*F16H 3/48* (2006.01)

(56) References Cited

U.S. PATENT DOCUMENTS

| | | | |
|---|---|---|---|
| 2005/0247147 A1* | 11/2005 | Gumpoltsberger | F16H 3/006 74/325 |
| 2009/0036247 A1* | 2/2009 | Earhart | F16H 37/0833 475/35 |
| 2010/0162840 A1 | 7/2010 | Gitt | |
| 2012/0006155 A1* | 1/2012 | Hasewend | F16D 31/02 74/730.1 |
| 2013/0340567 A1 | 12/2013 | Takahashi et al. | |
| 2015/0345603 A1* | 12/2015 | Kaltenbach | F16H 37/046 74/661 |

FOREIGN PATENT DOCUMENTS

| | | |
|---|---|---|
| JP | H06-074828 B2 | 9/1994 |
| JP | 2005-147194 A | 6/2005 |
| JP | 2010-531417 A | 9/2010 |
| WO | 2012102337 A1 | 8/2012 |

* cited by examiner

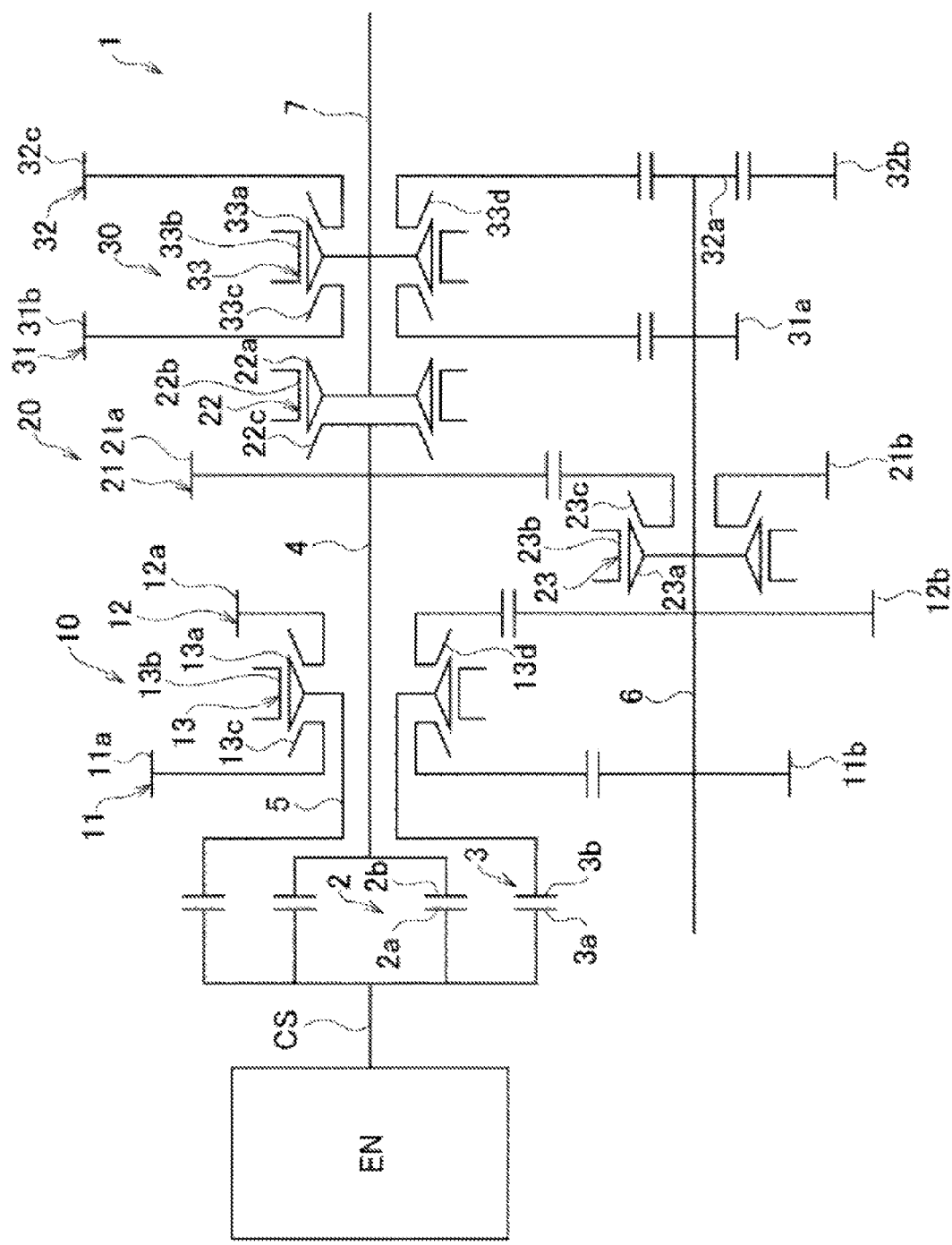
[FIG.1]

[FIG.2]
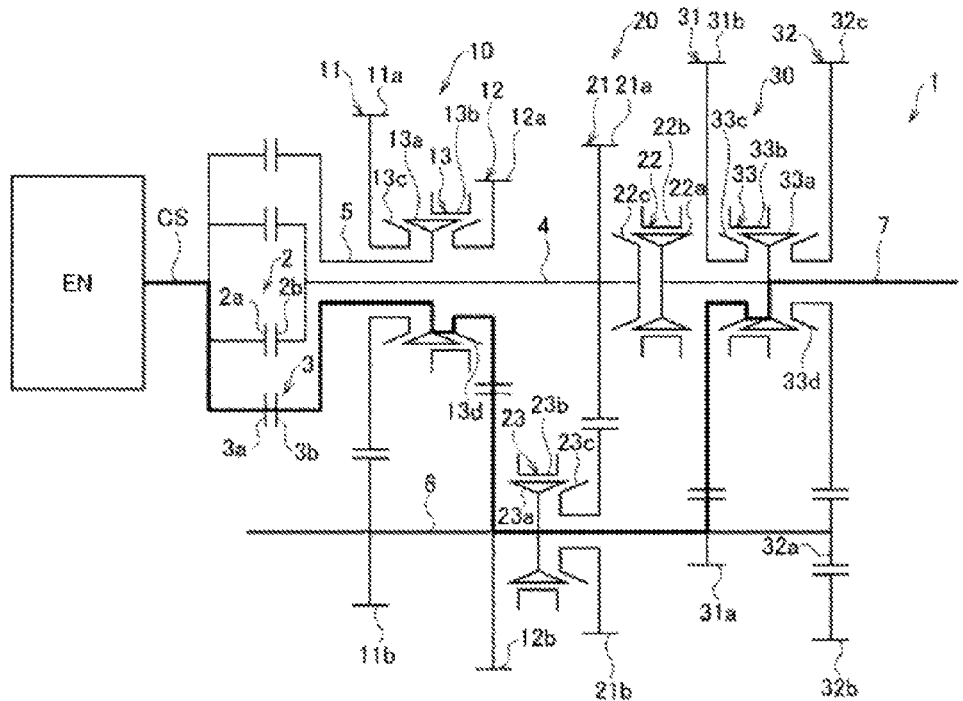
[FIG.3]
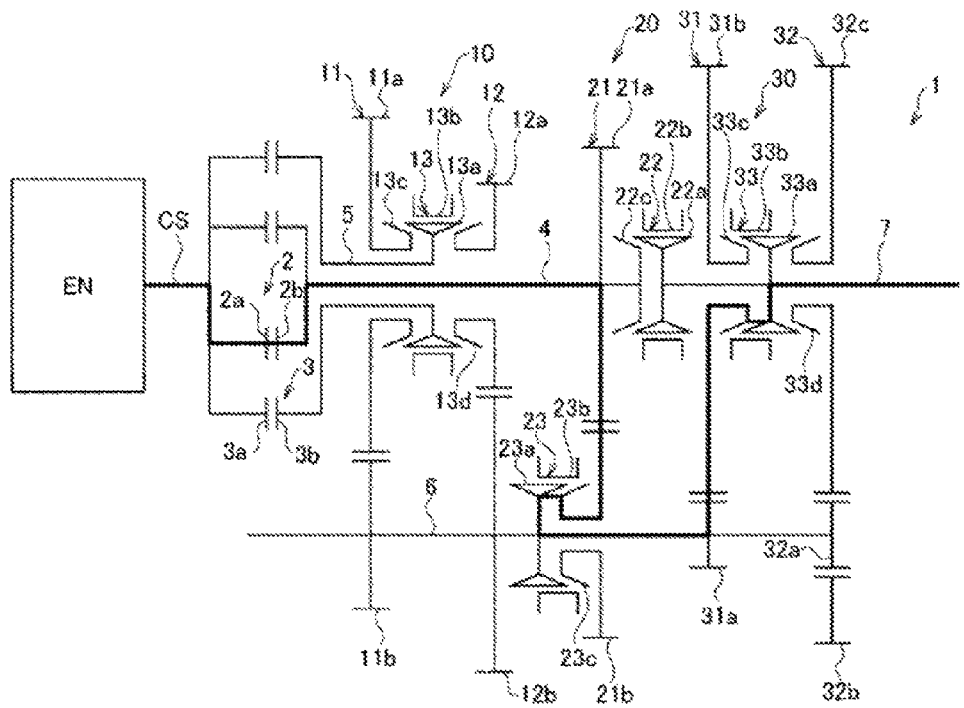

[FIG.4]
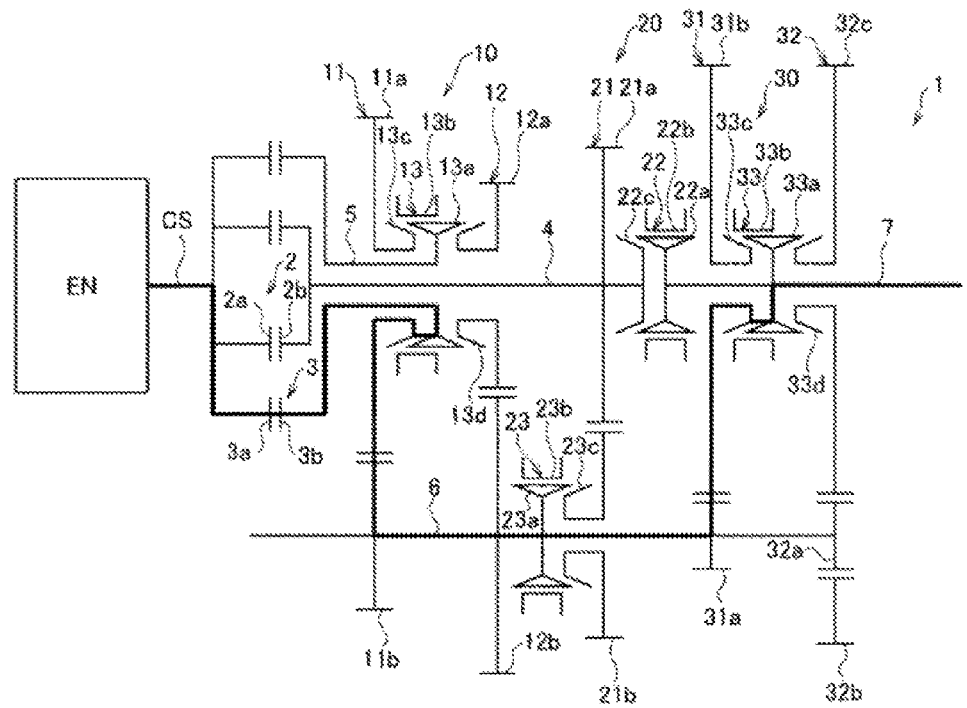
[FIG.5]
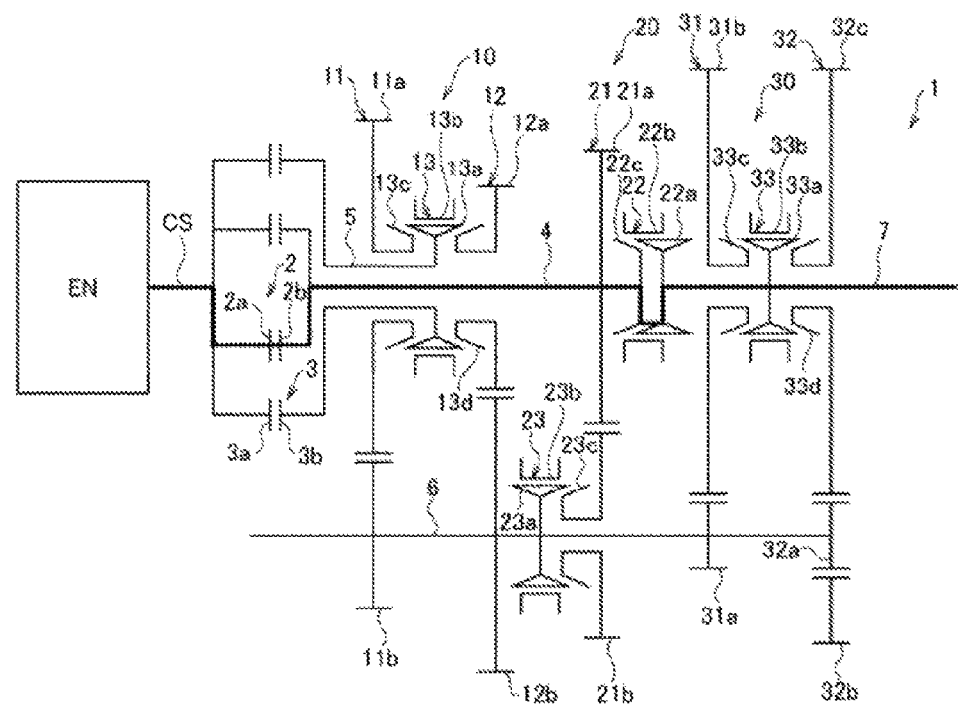

[FIG.6]
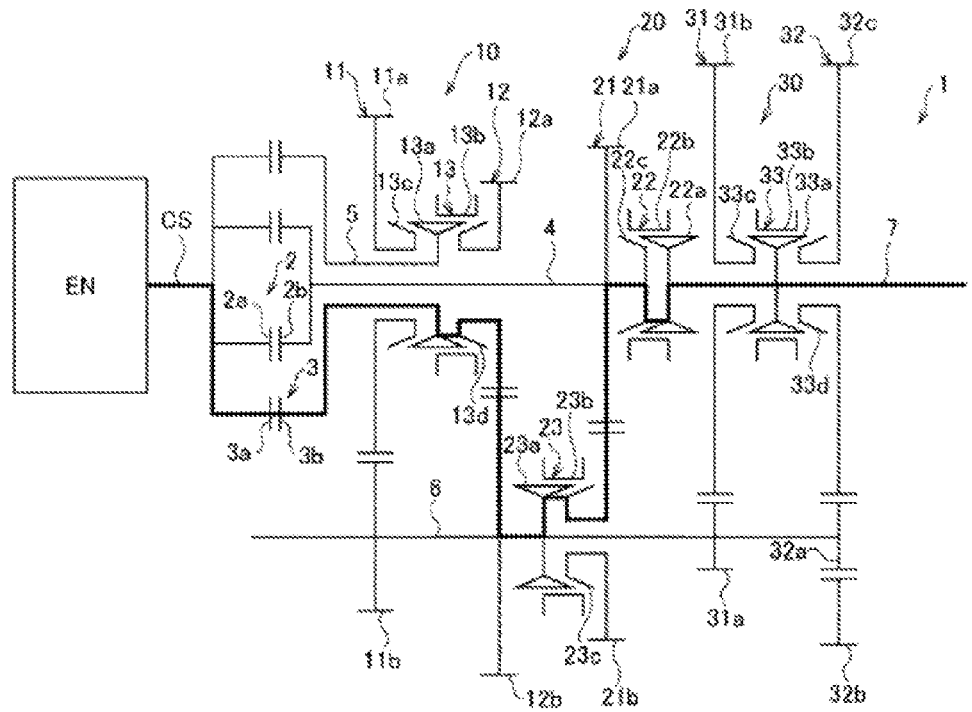
[FIG.7]
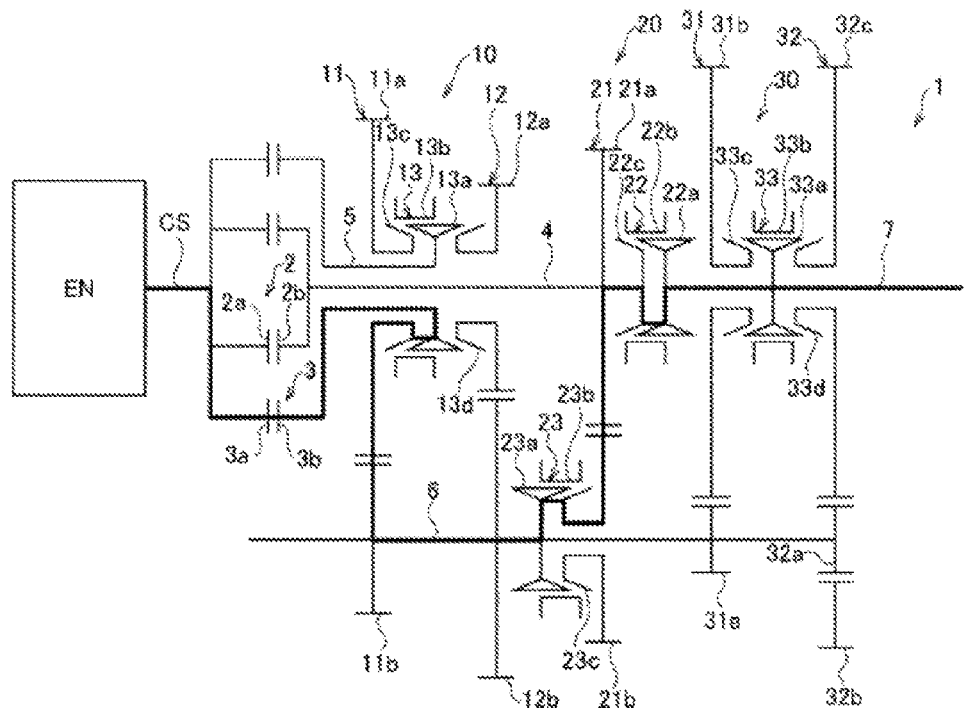

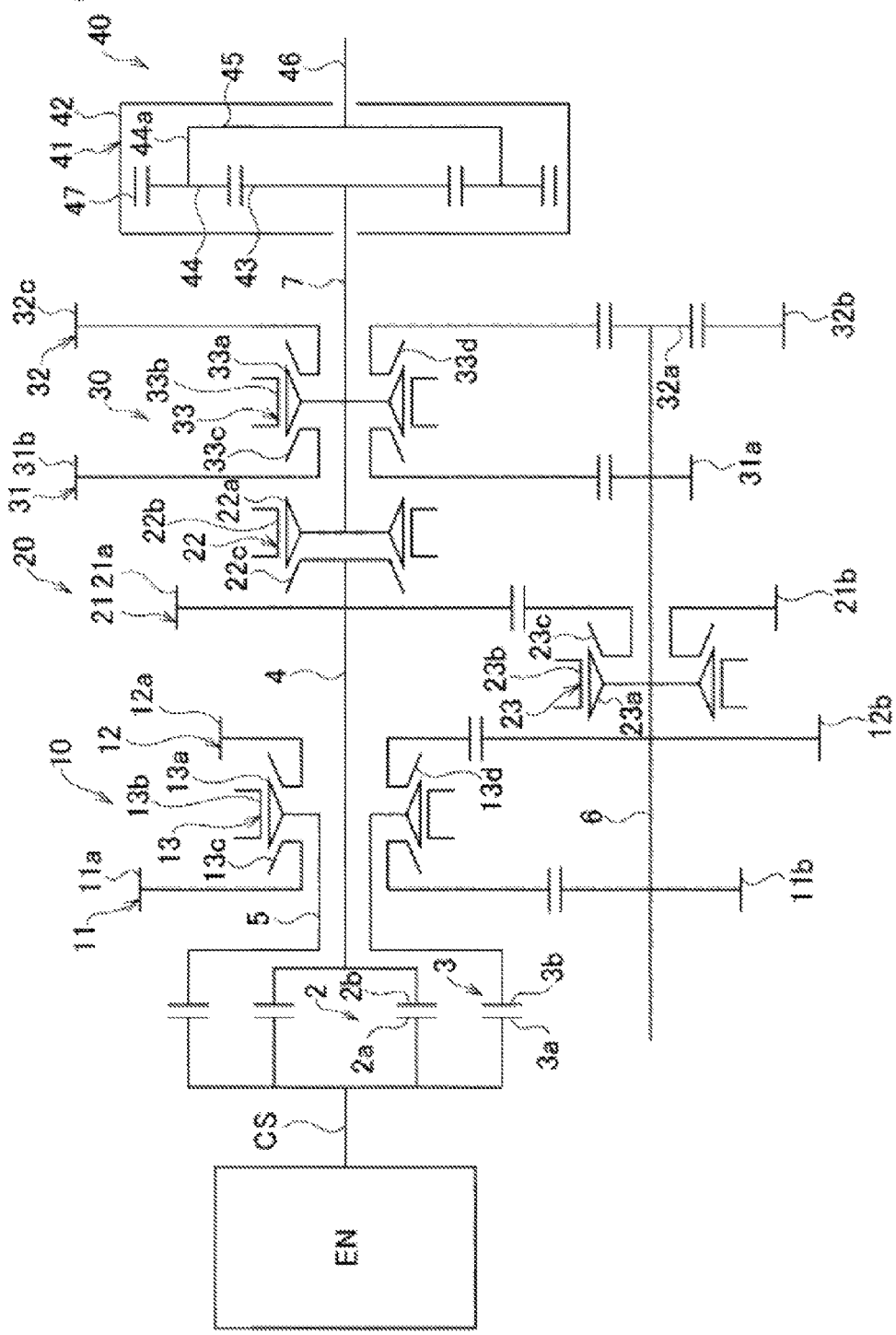

[FIG.9]
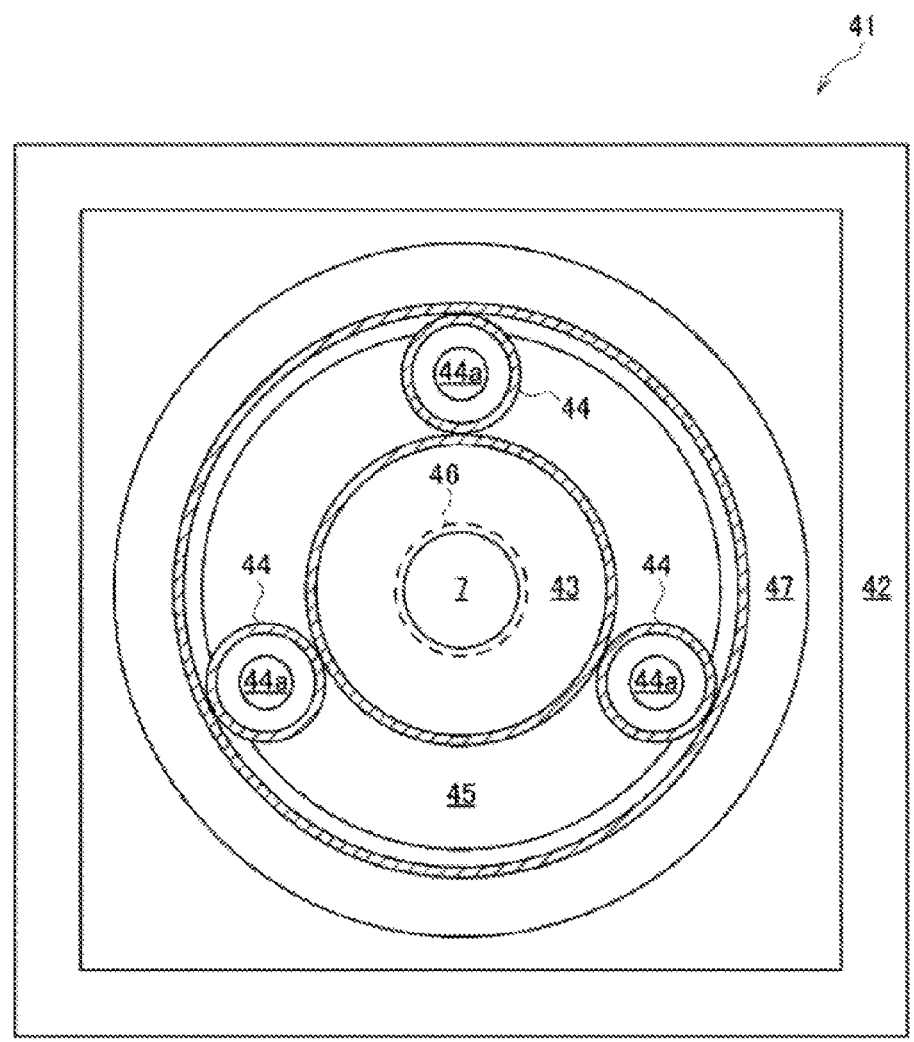

[FIG.10]
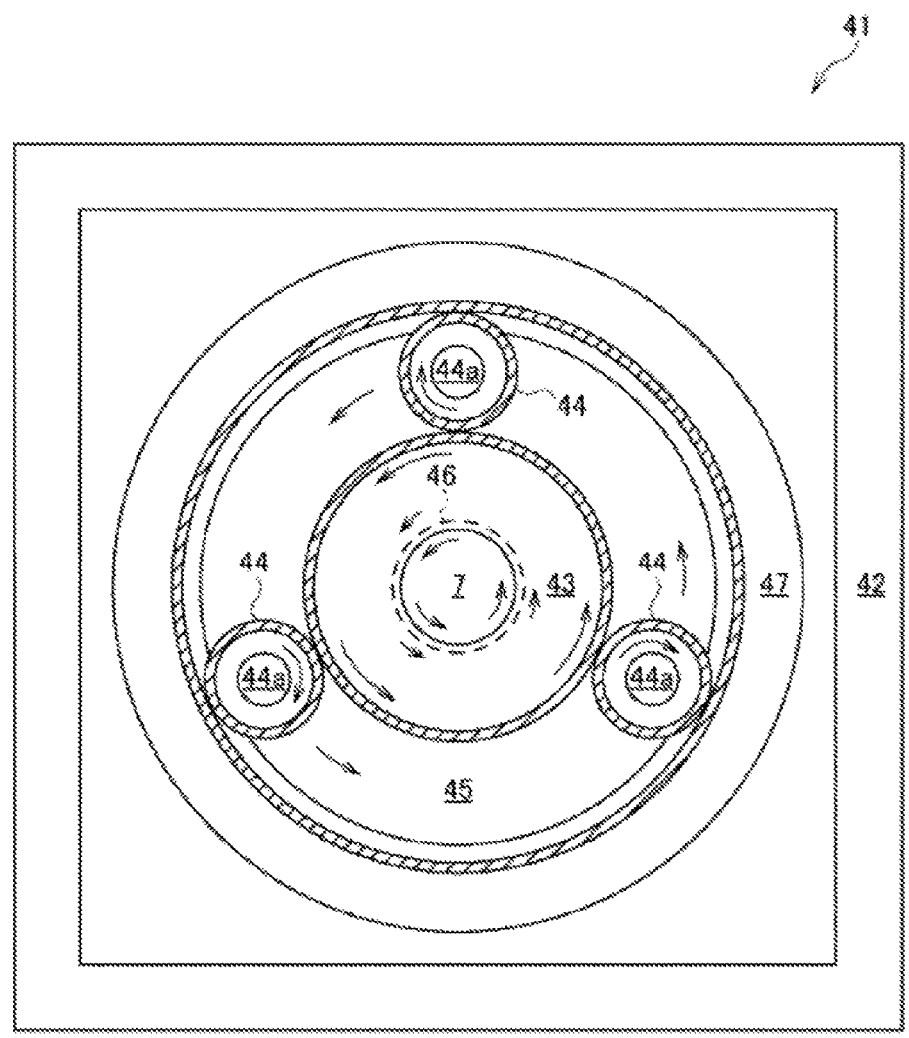

[FIG.11]
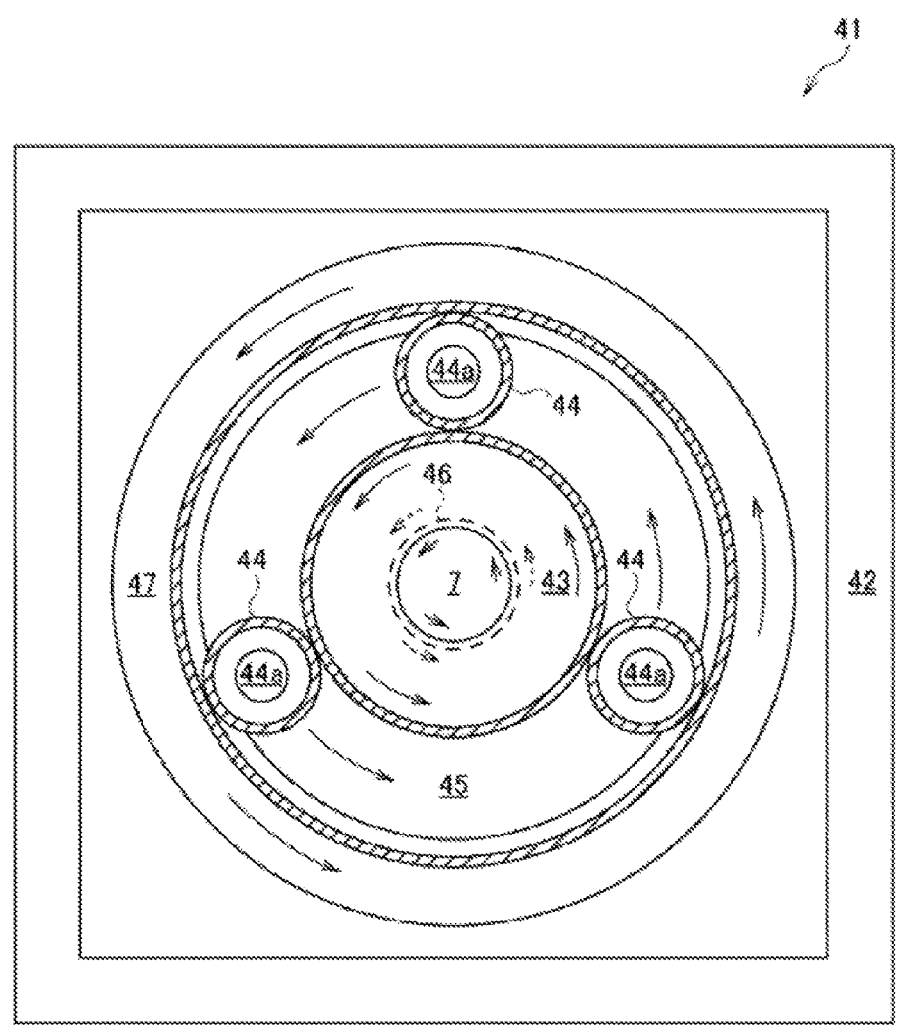

DUAL CLUTCH TRANSMISSION

TECHNICAL FIELD

The present invention relates to a dual clutch transmission configured to be mounted on a vehicle.

Background Art

Conventionally, there have been known dual clutch transmissions having two clutches (for example, refer to PTL 1). A dual clutch transmission, which is a power transmission mechanism, has two systems of odd-numbered gears and even-numbered gears which correspond individually to two clutches thereof and changes the gears by engaging the two systems in an alternate fashion. With such a dual clutch transmission, since while one system is engaged, the other system is waiting, a gear change requires a short period of time.

A dual clutch transmission described in Patent Literature 1 realizes six gears to be changed while suppressing the increase in the number of gears by fixing two gears to each other which are provided rotatably on a counter shaft.

PRIOR ART LITERATURE

Patent Literature

PTL 1: JP-T-2010-531417

SUMMARY OF INVENTION

Technical Problem

In the transmission of Patent Literature 1, however, since thrust force is generated in the two gears which are fixed to each other, there is imposed restriction on the numbers of teeth of the gears, which reduces the degree of freedom in designing the transmission.

Then, an object of the invention is to provide a dual clutch transmission which can increase the number of gears to be changed while suppressing the reduction in degree of freedom in design.

Solution to Problem

With a view to achieving the object, a dual clutch transmission according to a first aspect of the invention is a dual clutch transmission mounted on a vehicle which includes a first clutch, a second clutch, a first input shaft, a second input shaft, a counter shaft, an output shaft, a first splitter gear changing portion, a second splitter gear changing portion, and an output portion.

The second clutch is disposed concentrically with the first clutch. The first input shaft is connected to a power source via the first clutch. The second input shaft is a hollow shaft through which the first input shaft is inserted rotatably and is connected so the power source via the second clutch. The counter shaft is disposed parallel to the first input shaft and the second input shaft. The output shaft is disposed parallel to the counter shaft and coaxial with the first input shaft and the second input shaft.

The first splitter gear changing portion has a first input gear through which the second input shaft is inserted rotatably, a first counter gear which is fixed to the counter shaft and which meshes with the first input gear, a second input gear through which the first input shaft is inserted rotatably, a second counter gear which is fixed to the counter shaft and which meshes with the second input gear, and a first coupling mechanism which can couple the first input gear and the second input gear selectively to the second input shaft.

The second splitter gear changing portion has a input/output gear which is fixed to the first input shaft, a third counter gear through which the counter shaft, is inserted rotatably and which meshes with the input/output gear, a second coupling-mechanism which can couple the output shaft to the first input shaft, and a third coupling mechanism which can couple the third counter gear to the counter shaft.

The output portion has a fourth counter gear which is fixed to the counter shaft, an output gear through which the output shaft is inserted rotatably and which meshes with the fourth counter gear, and a fourth coupling mechanism which can couple the output gear to the output shaft.

In the configuration described above, the second input gear, the input/output gear and the first input gear are made use of sequentially, and the output gear is made use of as required. This realizes three gears to be changed on a tow-speed side.

In addition, the second input gear and the first input gear are made use of sequentially, and the input/output gear is made use of as required. This realizes three gears to foe changed on a high-speed side, including the engagement of a fourth gear where the first input shaft is coupled directly to the output shaft.

Consequently, it is possible to increase the number of gears to be changed without increasing the number of gears. In addition, no thrust force is generated in each of the gears, and there is imposed no restriction on the number of gears.

A dual clutch according to a second aspect of the invention is the dual clutch transmission according to the first aspect which includes a range gear mechanism.

The range mechanism has a case into which an output shaft is inserted rotatably, a sun gear which is fixed to the output shaft inside the case, a planetary gear which meshes with the sun gear and configured to revolve around the sun gear, a planetary carrier to which a rotational shaft of the planetary gear is fixed, a range output shaft which is fixed to the planetary carrier so as to be disposed coaxial with the output shaft, an outer gear which meshes with the planetary gear, a fifth coupling mechanism which can couple the outer gear to the case, and a sixth coupling mechanism which can couple the planetary carrier or the range output shaft to the output shaft.

In the configuration described above, a first gear to a fifth gear are realized by rotating the range output shaft at lower speeds than a speed at which the output shaft is rotated.

A sixth gear to a tenth gear are realized by coupling the output shaft directly to the range output shaft.

Consequently, it is possible to increase further the number of gears to be changed without increasing the number of gears.

Advantageous Effect of Invention

According to the dual clutch transmissions of the invention, it is possible to increase the number of gears to be changed while suppressing the reduction in degree of freedom in design.

BRIEF DESCRIPTION OF DRAWINGS

FIG. 1 is a schematic diagram showing a dual clutch transmission according to a first embodiment of the invention.

FIG. 2 is a diagram showing a power transmission path when a first gear is engaged in the dual clutch transmission shown in FIG. 1.

FIG. 3 is a diagram showing a power transmission path when a second gear is engaged in the dual clutch transmission shown in FIG. 1.

FIG. 4 is a diagram showing a power transmission path when a third gear is engaged in the dual clutch transmission shown in FIG. 1.

FIG. 5 is a diagram showing a power transmission path when a fourth gear is engaged in the dual clutch transmission shown in FIG. 1.

FIG. 6 is a diagram showing a power transmission path when a fifth gear is engaged in the dual clutch transmission shown in FIG. 1.

FIG. 7 is a diagram showing a power transmission path when a sixth gear is engaged in the dual clutch transmission shown in FIG. 1.

FIG. 8 is a schematic diagram showing a dual clutch transmission according to a second embodiment of the invention.

FIG. 9 is a schematic diagram showing a range gear mechanism.

FIG. 10 is a diagram illustrating operations occurring when a first gear to a fifth gear are realized hi the range gear mechanism shown in FIG. 9.

FIG. 11 is a diagram illustrating operations occurring when a sixth gear to a tenth gear are realized in the range gear mechanism shown in FIG. 9.

DESCRIPTION OF EMBODIMENTS

Hereinafter, a first embodiment of the invention will be described in detail by reference to the drawings.

A dual clutch transmission 1 shown in FIG. 1 is configured to be mounted on a vehicle. Specifically, the dual clutch transmission 1 is controlled functionally by an ECU (whose illustration is omitted) and includes a first clutch 2, a second clutch 3, a first input shaft 4, a second input shaft 5, a counter shaft 6, an output shaft 7, a first splitter gear changing portion 10, a second splitter gear changing portion 20, and an output portion 30.

The first clutch 2 includes a first pressure plate 2a and a first clutch disc 2b. The first pressure plate 2a is fixed to a crankshaft CS of an engine (a power source) EN and rotates together with the crankshaft CS. The first clutch disc 2b is fixed to an input end side of the first input shaft 4 and rotates together with, the first input shaft 4. The first clutch 2 transmits power of the engine EN to the first input shaft 4 when the first pressure plate 2a moves in the direction of the first clutch disc 2b to thereby be brought into press contact with the first clutch disc 2b.

The second clutch 3 is disposed concentrically with the first clutch 2. Specifically, the second clutch 3 includes a second pressure plate 3a and a second clutch disc 3b. The second pressure plate 3a is fixed to the crankshaft CS of the engine EN and rotates together with the crankshaft CS. The second clutch disc 3b is fixed to an input end side of the second input shaft 5 and rotates together with the second input shaft 5. The second clutch 3 transmits the power of the engine EN to the second input shaft 5 when the second pressure plate 3a moves in the direction of the second clutch disc 3b to thereby he brought into press contact with the second clutch disc 3b.

The first input shaft 4 is connected to the engine EN via the first clutch 2. This first input shaft 4 rotates as a result of the power of the engine EN being transmitted thereto.

The second input shaft 5 is a hollow shaft through which the first input shaft 4 is inserted rotatably and is connected, to the engine EN via the second clutch 3. This second input shaft 5 rotates in the same direction as a direction in which the first input shaft 4 rotates as a result of the power of the engine EN being transmitted thereto.

The counter shaft 6 is disposed parallel to the first input shaft 4 and the second input shaft 5.

The output shaft 7 is disposed parallel to the counter shaft 6 and coaxial with the first input shaft 4 and the second input shaft 5.

The first splitter gear changing portion 10 includes a first high-speed gear train 11, a low-speed gear train 12 and a first coupling mechanism 13.

The high-speed gear train 11 includes a first input gear 11a and a first counter gear 11b. The first input gear 11a is provided so that the second input shaft 5 is inserted therethrough rotatably and rotates about the second input shaft 5. The first counter gear 11b is fixed to the counter shaft 6 and rotates together with the first input gear 11a. This first counter gear 11b rotates about the counter shaft 6 together with the counter shaft 6 in an opposite direction to a direction in which the first input gear 11a rotates in association with the rotation of the first input gear 11a.

The low-speed gear train 12 includes a second input gear 12a and a second counter gear 12b. The second input gear 12a is provided so that the first input shaft 4 is inserted therethrough rotatably and rotates about the first input shaft 4. The second counter gear 12b is fixed to the counter shaft 6 and meshes with the second input gear 12a. This second counter gear 12b rotates about the counter shaft 6 together with the counter shaft 6 in an opposite direction to a direction in which the second input gear 12a rotates in association with the rotation of the second input gear 12a.

The first coupling mechanism 13 can couple the first input gear 11a and the second input gear 12a selectively to the second input shaft 5. Specifically, the first coupling mechanism 13 includes a coupling hub 13a, a sleeve 13b, and dog gears 13c, 13d. The coupling hub 13a is fixed to an output end side of the second input shaft 5 and rotates together with the second input shaft 5. The sleeve 13b is provided so as not to rotate but to move axially relative to the coupling hub 13a. The dog gear 13c is fixed to the first input gear 11a and rotates together with the first input gear 11a. The dog gear 13d is fixed to the second input gear 12a and rotates together with the second input gear 12a.

The first coupling mechanism 13 couples the first input gear Ha to the second input shaft 5 when the sleeve 13b moves in the direction of the dog gear 13c to thereby be brought into engagement with the dog gear 13c. As this occurs, the first input gear 11a can rotate together with the second input shaft 5. On the other hand, the first coupling mechanism 13 couples the second input gear 12a to the second input shaft 5 when the sleeve 13b moves in the direction of the dog gear 13d to thereby brought into engagement with the dog gear 13d. As this occurs, the second input gear 12a can rotate together with the second input at shaft 5.

The second splitter gear changing portion 20 includes an input/output gear train 21, a second coupling mechanism 22 and a third coupling mechanism 23.

The input/output gear train 21 includes an input/output gear 21a and a third counter gear 21b. The input/output gear 21a is fixed to the first input shaft 4. This input/output gear 21a rotates about the first input shaft 4 together with the first, input shaft 4. The third counter gear 21b is provided so that the counter shaft 6 is inserted therethrough rotatably and the third counter gear 21*b* meshes with the input/output gear 21*a*. This third counter gear 21*b* rotates about the counter shaft 6 in an opposite direction to a direction in which the input/output gear 21*a* rotates in association with the rotation of the input/output gear 21*a*.

The second coupling mechanism 22 can couple the output shaft 7 to the first input shaft 4. Specifically, the second coupling mechanism 22 includes a coupling hub 22*a*, a sleeve 22*b*, and a dog gear 22*c*. The coupling hub 22*a* is fixed to an input end side of the output shaft 7 and rotates together with the output shaft 7. The sleeve 22*b* is provided so as not to rotate but to move axially relative to the coupling hub 22*a*. The dog gear 22*c* is fixed to an output end side of the first input shaft 4 and rotates together with the first input shaft 4.

The second coupling mechanism 22 couples the output shaft 7 to the first input shaft 4 when the sleeve 22*b* moves in the direction of the dog gear 22*c* to thereby be brought into engagement with the dog gear 22*c*. As this occurs, the output shaft can rotate together with the first input shaft 4.

The third coupling mechanism 23 can couple the third counter gear 21*b* to the counter shaft 6. Specifically, the third coupling mechanism 23 includes a coupling hub 23*a*, a sleeve 23*b*, and a dog gear 23*c*. The coupling hub 23*a* is fixed the counter shaft 6 and rotates together with the counter shaft 6. The sleeve 23*b* is provided so as not to rotate but to move axially relative to the coupling hub 23*a*. The dog gear 23*c* is fixed to the third counter gear 21*b* and rotates together with the third counter gear 21*b*.

The third coupling mechanism 23 couples the third counter gear 21*b* to the counter shaft 6 when the sleeve 23*b* moves in the direction of the dog gear 23*c* to be brought into engagement with the dog gear 23*c*. As this occurs, the third counter gear 21*b* can rotate together with the counter shaft 6.

The output portion 30 includes a forward gear train 31, a reverse gear train 32 and a fourth coupling mechanism 33.

The forward gear train 31 includes a fourth counter gear 31*a* and a forward output gear 31*b*. The fourth counter gear 31*a* is fixed to the counter shaft 6. The fourth counter gear 31*a* rotates about the counter shaft 6 together with the counter shaft 6. The forward output gear 31*b* is provided so that the output shaft 7 is imported therethrough rotatably and the forward output gear 31*b* meshes with the fourth counter gear 31*a*. This forward output gear 31*b* rotates about the output shaft 7 in an opposite direction to a direction in which the fourth counter gear 31*a* rotates in association with the rotation of the fourth counter gear 31*a*.

The reverse gear train 32 includes a fifth counter gear 32*a*, an idler gear 32*b* and a reverse output gear 32*c*. The fifth counter gear 32*a* is fixed to the counter shaft 6. The fifth counter gear 32*a* rotates about the counter shaft 6 together with the counter shaft 6. The idler gear 32*b* is provided so as not only to be attached to a shaft (whose illustration is omitted) parallel to the counter shaft 6 hut also to mesh with the fifth counter gear 32*a*. This idler gear 32*b* rotates in an opposite direction to a direction in which the fifth counter gear 32*a* rotates in association with the rotation of the fifth counter gear 32*a*. The reverse output gear 32*c* is provided so that the output shaft 7 is inserted therethrough rotatably and the reverse output gear 32*c* meshes with the idler gear 32*b*. The reverse output gear 32*c* rotates about the output shaft 7 in an opposite direction to a direction in which the idler gear 32*b* rotates and in the same direction as a direction in which the fifth counter gear 32*a* rotates in association with the rotation of the idler gear 32*b*. A relationship among the fifth counter gear 32*a*, the idler gear 32*b* and the reverse output gear 32*c* in the drawings is drawn according to the conventional practice and differs from a relationship in reality.

The fourth coupling mechanism 33 can couple the forward output gear 31*b* and the reverse output gear 32*c* selectively to the output shaft 7. Specifically, the fourth coupling mechanism 33 includes a coupling hub 33*a*, a sleeve 33*b*, and dog gears 33*c*, 33*d*. The coupling hub 33*a* is fixed to an output shaft 7 and rotates together with the output shaft 7. The sleeve 33*b* is provided so as not to be fixed but to move axially relative to the coupling hub 33*a*. The dog gear 33*c* is fixed to the forward output gear 31*b* and rotates together with the forward output gear 31*b*. The dog gear 33*d* is fixed to the reverse output gear 32*c* and rotates together with the reverse output gear 32*c*.

The fourth coupling mechanism 33 couples the forward output gear 31*b* to the output shaft 7 when the sleeve 33*b* moves in the direction of the dog gear 33*c* to thereby be brought into engagement with the dog gear 33*c*. As this occurs, the forward output gear 31*b* can rotate together with the output shaft 7. On the other hand, the fourth coupling mechanism 33 couples the reverse output gear 32*c* to the output shaft 7 when the sleeve 33*b* moves in the direction of the dog gear 33*d* to thereby be brought into engagement with the dog gear 33*d*. As this occurs, the reverse output gear 32*c* can rotate together with the output shaft 7.

Next, power transmission paths of the dual clutch transmission 1 will be described.

When a first gear is engaged as shown in FIG. 2, in the dual clutch transmission 1, the second input gear 12*a* is coupled to the second input shaft 5 by the first coupling mechanism 13, the forward output gear 31*b* is coupled to the output shaft 7 by the fourth coupling mechanism 33, and the second clutch 3 is applied. This allows the power of the engine EN to be transmitted sequentially from the second clutch 3 to the second input shaft 5, the low-speed gear train 12, the counter shaft 6, the forward gear train 31 and the output shaft 7 in that order.

When a second gear is engaged as shown in FIG. 3, in the dual clutch transmission 1, the third counter gear 21*b* is coupled to the counter shaft 6 b the third coupling mechanism 23, the forward output gear 31*b* is coupled to the output shaft 7 by the fourth coupling mechanism 33 and the first clutch 2 is applied. This allows the power of the engine EN to be transmitted sequentially from the first clutch 2 to the first input shaft 4, the input/output gear train 21, the counter shaft 6, the forward gear train 31 and the output shaft in that order.

When a third gear is engaged as shown in FIG. 4, in the dual clutch transmission 1, the first input gear 11*a* is coupled to the second input shaft 5 by the first coupling mechanism 13, the forward output gear 31*b* is coupled to the output shaft 7 by the fourth coupling mechanism 33, and the second clutch 3 is applied. This allows the power of the engine EN to be transmitted sequentially from the second clutch 3 to the second input shaft 5, the high-speed gear train 11, the counter shaft 6, the forward gear train 31 and the output shaft 7 in that order.

When a fourth gear is engaged as shown in FIG. 5 in the dual clutch transmission 1, the output shaft 7 is coupled to the first input shaft 4 by the second coupling mechanism 22 and the first clutch 2 is applied. This allows the power of the engine EN to be transmitted sequentially from the first clutch 2 to the first input shaft 4 and the output shaft 7 in that order.

When a fifth gear is engaged as shown in FIG. 6, in the dual clutch transmission 1, the second input gear 12*a* is coupled to the second input shaft 5 by the first coupling mechanism 13, the output shaft 7 is coupled to the first input shaft 4 by the second coupling mechanism 22, the third counter gear 21b is coupled to the counter shaft 6 by the third coupling mechanism 23, and the second clutch 3 is applied. This allows the power of the engine EN to be transmitted sequentially from the second clutch 3 to the second input shaft 4, the low-speed gear train 12, the counter shaft 6, the input/output gear train 21, the first input shaft 4 and the output shaft 7 in that order.

When a sixth gear is engaged as shown in FIG. 7, in the dual clutch transmission 1, the first input gear 11a is coupled to the second input shaft 5 by the first coupling mechanism 13, the output shaft 7 is coupled to the first input shaft 4 by the second coupling mechanism 22, the third counter gear 21b is coupled to the counter shaft 6 by the third connecting mechanism 23, and the second clutch 3 is applied. This allows the power of the engine EN to be transmitted sequentially from the second clutch 3 to the second input shaft 4, the high-speed gear train 11, the counter shaft 6, the input/output gear train 21, the first input shaft 4, and the output shaft 7 in that order.

According to this embodiment, the second input gear 12a, the input/output gear 21a and the first input gear 11a are made use of sequentially, and the forward output gear 31b is made use of as required. This realizes three gears to be changed on a low-speed side.

In addition, the second input gear 12a and the first input gear 11a are made use of sequentially, and the input/output gear 21a is made use of as required. This realizes three gears to be changed on the high-speed side, including the engagement of the fourth gear where the first input shaft 4 is coupled directly to the output shaft 7.

Consequently, it is possible to increase the number of gears to be changed without increasing the number of gears. In addition, no thrust force is generated in each of the gears, and there is imposed no restriction on the number of gears.

Next, a second embodiment of the invention will be described in detail by reference to the drawings. A dual clutch transmission 40 according to the second embodiment is such that a range gear mechanism 41 is added to the dual clutch transmission 1 according to the first embodiment, and like reference numerals will be given to like configurations to those of the first embodiment. and the description thereof will be omitted.

The dual clutch transmission 40 shown in FIG. 8 includes the range gear mechanism 41.

The range gear mechanism 41 shown in FIGS. 8 and 9 includes a ease 42, a sun gear 43, a plurality of planetary gears 44, a planetary carrier 45, an range output shaft 46, an outer gear 47, a fifth coupling mechanism (whose illustration is omitted) and a sixth coupling mechanism (whose illustration is omitted).

An output end side of an output shaft 7 is inserted through the case 42 rotatably.

The sun gear 43 is fixed to the output shaft 7 inside the case 42. The sun gear 43 rotates about the output shaft 7 together with the output shaft 7.

The plurality of planetary gears 44 are provided so as to mesh with the sun gear 43 and can revolve around the sun gear 43.

Rotational shafts 44a of the planetary gears 44 are fixed to the planetary carrier 45.

The range output shaft 46 is fixed to the planetary carrier 45 and is disposed so as to be coaxial with the output shaft 7. This range output shaft 46 rotates together with the planetary carrier 45.

The outer gear 47 is provided so as not only to surround the plurality of planetary gears 44 altogether but also to mesh individually with the plurality of planetary gears 44.

The fifth coupling mechanism (whose illustration is omitted) can couple the outer gear 47 to the case 42.

The sixth coupling mechanism (whose illustration is omitted) can couple the planetary carrier 45 or the range output shaft 46 to the output shaft 7.

The details of the range gear mechanism 41 are similar to those of the mechanism disclosed in JP-B-06-074828, and JP-B-06-074828 should also be referred to.

Next, the operation of the range gear mechanism 41 will be described.

When a first gear to a fifth gear are engaged as shown in FIG. 10, in the range gear mechanism 41, the outer gear 47 is coupled to the case 42 by the fifth coupling mechanism (whose illustration is omitted). As this occurs, the sun gear 43 which is fixed to the output shaft 7 rotates together with the output shaft 7. The plurality of planetary gears 43 which mesh with the sun. gear 43 mesh individually with the outer gear 47 which is coupled to the case 42 so as not to rotate. Thus, the planetary gears 43 revolve around the sun gear 43 in the same direction as a direction in which the sun gear 43 rotates while rotating on their own shafts in an opposite direction to the direction in which the sun gear 43 rotates in association with the rotation of the sun gear 43. The planetary carrier 45, to which the rotational shafts 44a of the plurality of planetary gears 44 are fixed, rotates in the same direction as the direction in which the planetary gears 44 revolve around the sun gear 43 as the planetary gears 44 revolve around. The range output shaft 46 which is fixed to the planetary carrier 45 rotates together with the planetary carrier 45. This causes the range output shaft 46 to rotate at lower speeds than a speed at which the output shaft 7 rotates.

When a sixth gear to a tenth gear are engaged as shown in FIG. 11, in the range gear mechanism 41, the planetary carrier 45 or the range output shaft 46 is coupled to the output shaft 7 by the sixth coupling mechanism (whose illustration is omitted). As this occurs, the range output shaft 46 rotates together with the output shaft 7. This causes the range output shaft 46 to rotate at an equal speed to the speed at which the output shaft 7 rotates.

The power transmission paths to the output shaft 7 in the dual clutch transmission 40 which are realized when the first gear to the fifth rear are encaged are the same as the power transmission paths to the output shaft 7 in the dual clutch transmission 1 of the first embodiment which are realized when the first gear to the fifth gear are engaged, and the power transmission paths realized in the dual clutch transmission 40 when the sixth gear to the tenth gear are engaged are the same as the power transmission paths realized in the dual clutch transmission 1 when the first gear to the fifth gear are engaged.

According to this embodiment, the first gear to the fifth gear are realized by causing the range output shaft 46 to rotate at the lower speeds than the speed at which the output shaft 7 rotates.

In addition, the sixth gear to the tenth gear are realized by connecting the output shaft 7 directly to the range output shaft 46.

Consequently, it is possible to increase further the number of gears to be changed without increasing the number of gears.

Thus, while the embodiments to which the invention made by the inventor is applied have been described heretofore, the invention is not limited, at all by the description and the drawings which make up part of the disclosure of the invention based on the embodiments. Namely, other embodiments, examples and operating techniques which are made based on the embodiments described herein by those skilled in the art to which the invention pertains should all, of course, be included in the scope of the invention.

REFERENCE SIGNS LIST 1, 40 dual clutch transmission.
2 first clutch
3 second clutch
4 first input shaft
5 second input shaft
6 counter shaft
7 output shaft
10 first splitter gear changing portion
11a first input gear
11b first counter gear
12a second input gear
12b second counter gear
13 first coupling mechanism
20 second splitter gear changing portion
21a input/output gear
21b third counter gear
22 second coupling mechanism
23 third coupling mechanism
30 output portion
31a fourth counter gear
31b forward output gear (output gear)
33 fourth coupling mechanism
41 range gear mechanism
42 case
43 sun gear
44 planetary gear
44a rotational shaft
45 planetary carrier
46 range output shaft
47 outer gear
EN engine (power source)

The invention claimed is:
1. A dual clutch transmission comprising:
a first clutch;
a second clutch that is disposed concentrically with the first clutch;
a first input shaft that is connected to a power source via the first clutch;
a second input shaft that is a hoi low shaft through which the first input shaft is inserted rotatably, the second input shaft being connected to the power source via the second clutch;
a counter shaft that is disposed parallel to the first input shaft and the second input shaft;
an output shaft that is disposed parallel to the counter shaft and coaxial with the first input shaft and the second input shaft;
a first splitter gear changing portion comprising:
a first input gear through which the second input shaft is inserted rotatably;
a first counter gear that is fixed to the counter shaft and meshes with the first input gear;
a second input gear through which the first input shaft is inserted rotatably;
a second counter gear that is fixed to the counter shaft and meshes with the second input gear; and
a first coupling mechanism configured to couple the first input gear and the second input gear selectively to the second input shaft;
a second splitter gear changing portion comprising:
an input/output gear that is fixed to the first input shaft;
a third counter gear through which the counter shaft is inserted rotatably, the third counter gear meshing with the input/output gear;
a second coupling mechanism configured to couple the output shaft to the first input shaft; and
a third coupling mechanism configured to couple the third counter gear to the counter shaft; and
an output portion comprising:
a fourth counter gear that is fixed to the counter shaft;
an output gear through which the output shaft is inserted rotatably, the output gear meshing with the fourth counter gear; and
a fourth coupling mechanism configured to couple the output gear to the output shaft.

2. The dual clutch transmission according to claim 1, wherein the dual clutch transmission comprises:
a range mechanism comprising:
a case into which the output shaft is inserted rotatably;
a sun gear that is fixed to the output shaft inside the ease;
a planetary gear that meshes with the sun gear and configured to revolve around the sun gear;
a planetary carrier to which a rotational shaft of the planetary gear is fixed;
a range output shaft that is fixed to the planetary carrier so as to be disposed coaxial with the output shaft;
an outer gear that meshes with the planetary gear;
a fifth coupling mechanism configured to couple the outer gear to the case; and
a sixth coupling mechanism configured to couple the planetary carrier or the range output shaft to the output shaft.

* * * * *